US010647503B2

(12) United States Patent
Mariller

(10) Patent No.: US 10,647,503 B2
(45) Date of Patent: May 12, 2020

(54) CAPSULE FOR BEVERAGE PREPARATION

(76) Inventor: Alain Mariller, Le Mont-Pélerin (CH)

(*) Notice: Subject to any disclaimer, the term of this patent is extended or adjusted under 35 U.S.C. 154(b) by 167 days.

(21) Appl. No.: 12/937,868

(22) PCT Filed: Apr. 13, 2009

(86) PCT No.: PCT/IB2009/051534
§ 371 (c)(1),
(2), (4) Date: Nov. 23, 2010

(87) PCT Pub. No.: WO2009/128016
PCT Pub. Date: Oct. 22, 2009

(65) Prior Publication Data
US 2011/0079152 A1 Apr. 7, 2011

(30) Foreign Application Priority Data
Apr. 14, 2008 (WO) .................. PCT/IB2008/051412

(51) Int. Cl.
B65D 85/804 (2006.01)
A47J 31/06 (2006.01)

(52) U.S. Cl.
CPC ...... *B65D 85/8043* (2013.01); *A47J 31/0668* (2013.01)

(58) Field of Classification Search
CPC .............. A47J 31/0668; A47J 31/0663; B65D 85/8043
USPC ............................ 99/295, 426, 302, 323, 279
See application file for complete search history.

(56) References Cited

U.S. PATENT DOCUMENTS

| 4,136,202 | A | | 1/1979 | Favre | |
| 4,846,052 | A | * | 7/1989 | Favre et al. | ..................... 99/295 |
| 5,391,423 | A | * | 2/1995 | Wnuk et al. | ................... 428/217 |
| 7,677,158 | B2 | * | 3/2010 | McDuffie et al. | .......... 99/302 R |
| 2002/0015768 | A1 | * | 2/2002 | Masek et al. | .................. 426/115 |
| 2005/0236415 | A1 | * | 10/2005 | Ozasa | ....................... B32B 5/18 |
| | | | | | 220/574 |
| 2006/0065127 | A1 | | 3/2006 | Dalton | |
| 2007/0181591 | A1 | * | 8/2007 | Pierce | .................. B65D 43/022 |
| | | | | | 220/801 |

(Continued)

FOREIGN PATENT DOCUMENTS

| CH | 605 293 | 9/1978 | |
| EP | 1654966 A1 * | 5/2006 | ........... B65D 85/804 |
| EP | 1 839 543 | 10/2007 | |

(Continued)

OTHER PUBLICATIONS

English Translation of International Preliminary Report on Patentability (IPRP) for PCT/IB2009/051534, dated Dec. 6, 2010.

(Continued)

Primary Examiner — Michael G Hoang
(74) Attorney, Agent, or Firm — Harness, Dickey & Pierce, PLC

(57) ABSTRACT

The invention relates to a capsule for preparing a beverage, for example, coffee, including a hollow element intended to contain one serving, for example, ground coffee. The hollow element includes a side wall, an upper surface, a lower surface comprising an extraction membrane, and a lip in the shape of a collar. The latter is oriented according to a plane that cuts through the side wall. The lip comprises a material that becomes softened when it is placed in contact with a liquid.

16 Claims, 1 Drawing Sheet

(56) References Cited

U.S. PATENT DOCUMENTS

2008/0141865 A1* 6/2008 Bardazzi ............... A47J 31/368
99/279

FOREIGN PATENT DOCUMENTS

| | | |
|---|---|---|
| EP | 1 849 715 A1 | 10/2007 |
| EP | 2 070 828 | 6/2009 |
| JP | S62254719 A | 11/1987 |
| JP | H06507568 A | 9/1994 |
| JP | 2006515526 A | 6/2006 |
| WO | WO 93/17932 A1 | 9/1993 |
| WO | WO 03/073896 | 9/2003 |
| WO | WO 2004/064582 A2 | 8/2004 |
| WO | WO 2006111807 A1 * 10/2006 ......... B65D 85/8043 |
| WO | WO 2009/053811 | 4/2009 |

OTHER PUBLICATIONS

European Office Action dated Apr. 19, 2012.
Japanese Office Action dated Feb. 4, 2014, for applicant's Japanese Patent Application No. 2011-504589 corresponding to PCT/IB2009/051534 filed Apr. 13, 2009, and its English translation.
Japanese Office Action dated Jun. 4, 2013, for applicant's Japanese Patent Application No. 2011-504589 corresponding to PCT/IB2009/051534 filed Apr. 13, 2009, and its English translation.

\* cited by examiner

CAPSULE FOR BEVERAGE PREPARATION

CROSS-REFERENCE TO RELATED APPLICATIONS

This application is the U.S. national phase of International Application No. PCT/IB2009/051534 filed 13 Apr. 2009, which designated the U.S. and claims priority to PCT/IB2008/051412 filed 14 Apr. 2008, the entire contents of each of which are hereby incorporated by reference.

FIELD OF THE INVENTION

The field of the present invention is that of the preparation of beverages, based for example on coffee, by brewing a concentrated serving, of ground coffee for example, contained in a capsule. It relates more particularly to the servings used for this purpose and to the devices using such servings.

PRIOR ART

Capsules and machines operating on the abovementioned principle have existed for many decades.

U.S. Pat. Nos. 2,899,886, 2,968,560, 3,403,617 and 3,607,297 describe devices in which the capsule is initially perforated at several points before hot water is passed through it under pressure.

The capsule disclosed in patent CH 605 293 or in patent EP 0 242 556 B1 has a membrane at the bottom. Hot water under pressure is initially introduced into the top of the capsule. This causes a swelling of the capsule, principally of the membrane. Above a certain pressure the membrane tears, allowing a water-coffee mixture to flow out.

Other capsules provided with a membrane are disclosed in the following patent documents: EP 0 468 079 A, EP 0 806 373 A, EP 0 554 469 A.

Although most of the hot water introduced under pressure flows into and through the capsule, some flows out of it, down the outer face of the side wall. In theory, these leaks should not get further than the base of the side wall, because here the capsule cage is in contact with the lip.

Unfortunately this is not the case with prior art capsules. Some liquid can therefore escape from the machine and/or mix with the liquid that has passed through the interior of the capsule. In this latter scenario, the quality of the coffee is reduced.

There is therefore a need to reduce, and if possible eliminate, leaks of liquid flowing down the outer face of the side wall of the capsule.

SUMMARY OF THE INVENTION

One of the objects of the present invention is to improve upon prior art capsules.

Another object is to solve the seal problem described in the previous section.

More specifically, the invention seeks in particular to ensure that the liquid, which should in theory flow only into and through the capsule, does not flow out of it, down the outer side wall of the capsule, further than the contact region between the lip and the capsule cage.

This object, in particular, is achieved with the capsule according to the invention as defined in the main claim, and certain particular embodiments are defined in the dependent claims.

The invention has the advantage that it improves the seal between the lip and the lower part of the capsule cage. Specifically, as the water flows down the outer face of the wall of the capsule and contacts the lip, the lip softens. This allows the capsule cage to press more deeply into the thickness of the lip. The seal at this location is therefore improved.

Any material that behaves as indicated above, that is to say softens, can be used for the purposes of the present invention.

Advantageously it is a biodegradable material.

BRIEF DESCRIPTION OF THE DRAWINGS

The invention is described in more detail below by means of examples illustrated in the accompanying figures.

DETAILED DESCRIPTION OF THE INVENTION

Figure 1:
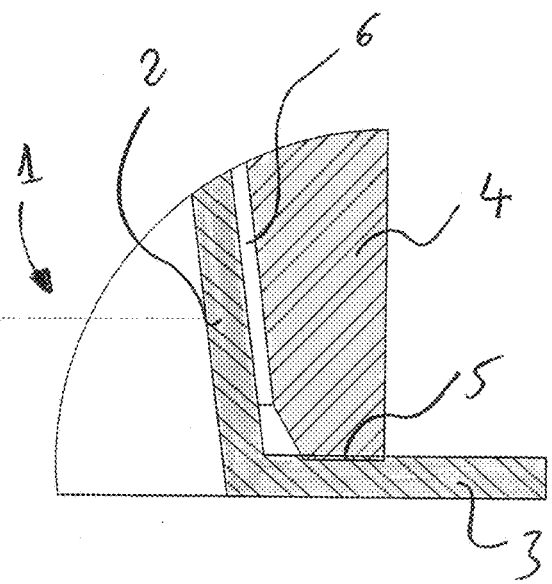
FIG. 1 shows a capsule 1 according to the invention after closure of the cage 4, but before hot water enters.
Figure 2:
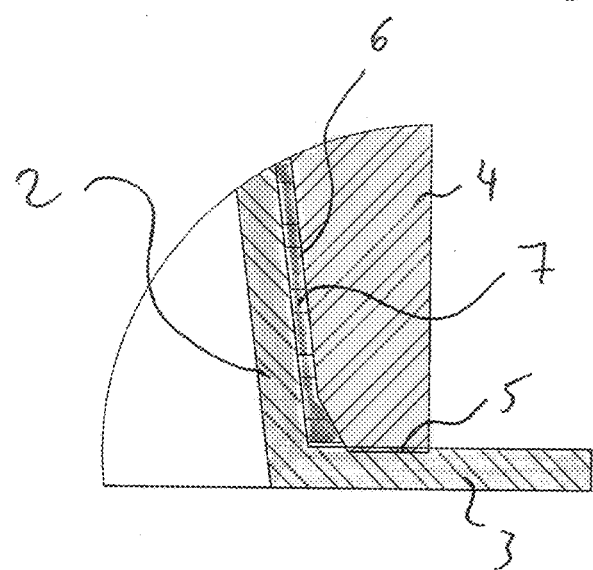
FIG. 2 shows the entrance of hot water 7, principally into the capsule 1, but also into the space 6 between the outer face of the side wall 2 of the capsule and the inside face of the cage 4.
Figure 3:
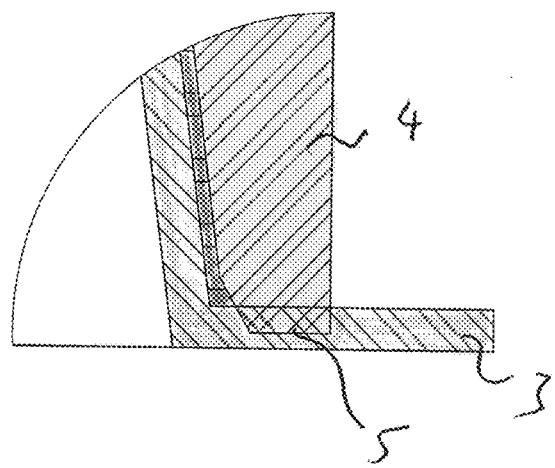
FIG. 3 shows the positioning of the cage 4 relative to the lip, following softening of the latter.

According to the invention, the capsule 1 for preparing a beverage, such as coffee, comprises a hollow element designed to contain a serving, of ground coffee for example. The hollow element comprises a side wall 2, an upper face, a lower face with a discharge membrane, and a lip 3; said side wall 2 being continued at its bottom in such a way as to form said lip 3, the latter being oriented in a plane that intersects said side wall 2. According to the invention, the lip 3 is formed at least partly of a material that softens when placed in contact with a liquid.

The temperature at which said material softens is preferably above room temperature.

The present invention is not limited to the examples and embodiments described purely by way of illustration. Variations are possible within the scope of the claimed protection, particularly by employing equivalent means.

LIST OF REFERENCE NUMBERS USED IN THE FIGURES

1. Capsule
2. Side wall
3. Lip
4. Cage
5. Bottom of cage
6. Space between capsule and cage
7. Water

The invention claimed is:

1. A capsule for preparing a coffee beverage, the capsule comprising:
   (a) a hollow cavity containing a ground coffee serving, the hollow cavity being surrounded by a side wall, a first face and a second face comprising a discharge membrane, and the side wall having a portion integrally continuing as a lip, and the lip intersecting the side wall at an end thereof;
   (b) the lip softening and becoming indented if placed in contact with hot water, of a temperature adapted to make the coffee beverage, during the preparation of the coffee beverage, and if the lip softens when placed in contact with the water during the preparation of the coffee beverage then a liquid seal is created;

(c) the lip being defined by parallel planar surfaces bordered by a straight peripheral edge;

(d) the planar surfaces of the lip being made solely of biodegradable and liquid-softenable material which directly creates the liquid seal in a thermal deformable manner; and (e) the lip being adapted to soften on contact with the hot water if the water temperature is above room temperature.

2. The capsule as claimed in claim 1, wherein the side wall and the lip are a single piece with the lip being an offset angled extension of the side wall.

3. The capsule as claimed in claim 1, wherein the lip is also adapted to increase its volume when it comes into contact with the hot water.

4. The capsule as claimed in claim 1, wherein the first face of the capsule is perforated to allow access of the hot water, and the discharge membrane tears to allow a water-coffee mixture to flow out therefrom.

5. The capsule according to claim 1, wherein the lip softens when placed in contact with the hot water flowing down an outer face of the side wall of the capsule during the preparation of the coffee beverage.

6. The capsule according to claim 1, wherein the seal is improved between the lip and a lower portion of a capsule cage when the lip softens when placed in contact with the water and when the lower portion of the capsule cage presses into a thickness of the lip.

7. The capsule according to claim 1, wherein the seal is improved between the lip and a lower portion of a capsule cage when the lip softens when placed in contact with the hot water flowing down an outer face of the side wall of the capsule during the preparation of the beverage thereby allowing the lower portion of the capsule cage to press into a thickness of the lip.

8. The capsule according to claim 1, wherein the seal is improved between the lip and a lower portion of a capsule cage by having the lip extending over an inside face of the cage and an outside face of the cage.

9. The capsule according to claim 1, further comprising a lower edge of a capsule cage that presses into the lip so as to make a portion of the lip which contacts with the cage thinner than a remainder of the lip when the lip is softened.

10. A coffee capsule comprising:

(a) a side wall, upper face and membrane defining a hollow space holding coffee grounds therein;

(b) a lip extending as a single piece from the side wall adjacent to the membrane, the lip being defined by parallel planar surfaces bordered by a straight edge prior to contact with hot water;

(c) the lip being at least partly of a biodegradable lip material, (d) the lip being softenable if placed in contact with the hot water during the preparation of coffee and allowing sealed compression at a localized sealing contact portion thereof if the hot water contacts the lip at a water temperature adapted to make the coffee;

(e) sections of the planar lip laterally extending inwardly and outwardly past the softenable localized sealing contact portion of the lip at least prior to sealing deformation at the sealing contact portion;

(f) the upper face of the capsule being perforable to allow access to the hot water, and a discharge membrane being tearable to allow a water-coffee mixture to flow out therefrom; and (g) sealing is improved between the lip and a lower portion of a capsule cage by having the sections of the lip laterally extending past an inside face of the cage and past an outside face of the cage.

11. The capsule according to claim 10, wherein the lip is entirely defined by parallel flat surfaces which intersect the sidewall.

12. The capsule according to claim 10, wherein the lip softens when placed in contact with the hot water flowing down an outer face of the side wall of the capsule during the preparation of the coffee.

13. The capsule according to claim 10, wherein sealing is improved between the lip and the lower portion of the capsule cage when the lip softens when placed in contact with the water and when a lower portion of the capsule cage presses into a thickness of the lip.

14. The capsule according to claim 10, wherein sealing is improved between the lip and the lower portion of the capsule cage when the lip softens when placed in contact with the hot water flowing down an outer face of the side wall of the capsule during the preparation of the coffee thereby allowing the lower portion of the capsule cage to press into a thickness of the lip.

15. The capsule according to claim 10, further comprising a lower edge of the capsule cage that presses into the lip so as to make a portion of the lip which contacts with the cage thinner than a remainder of the lip when the lip is softened.

16. The capsule according to claim 10, wherein the lip outside of the localized sealing contact portion is adapted to increase its volume if the hot water contacts the lip.

* * * * *